(12) United States Patent
Quinton et al.

(10) Patent No.: US 11,599,459 B2
(45) Date of Patent: Mar. 7, 2023

(54) COMMUNICATION GATEWAY FOR COMMUNICATING DATA FRAMES FOR A MOTOR VEHICLE

(71) Applicant: Continental Automotive GmbH, Hannover (DE)

(72) Inventors: Damien Quinton, Toulouse (FR); Philippe Olivet, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 248 days.

(21) Appl. No.: 17/147,710

(22) Filed: Jan. 13, 2021

(65) Prior Publication Data
US 2021/0224188 A1    Jul. 22, 2021

(30) Foreign Application Priority Data

Jan. 20, 2020  (FR) ...................... 2000505

(51) Int. Cl.
*G06F 12/14* (2006.01)
*G06F 12/06* (2006.01)
*H04L 12/40* (2006.01)
*H04L 12/66* (2006.01)

(52) U.S. Cl.
CPC .... *G06F 12/0646* (2013.01); *H04L 12/40006* (2013.01); *H04L 12/66* (2013.01); *H04L 2012/40215* (2013.01); *H04L 2012/40273* (2013.01)

(58) Field of Classification Search
CPC .................................................. G06F 12/0646
USPC ....................................................... 711/202
See application file for complete search history.

(56) References Cited

U.S. PATENT DOCUMENTS 6,430,672 B1 *  8/2002  Dhong ................ G06F 12/0292
                                                          711/208
6,434,144 B1 *  8/2002  Romanov ............... H04L 45/00
                                                          370/395.32
6,665,601 B1 * 12/2003  Nielsen ................... H04L 12/40
                                                          710/60

(Continued)

FOREIGN PATENT DOCUMENTS

EP    1798904 A1    6/2007

OTHER PUBLICATIONS

French Search Report and Written Opinion for French Application No. 2000505, dated Sep. 17, 2020, 10 pages.

*Primary Examiner* — Titus Wong
(74) *Attorney, Agent, or Firm* — RatnerPrestia

(57) ABSTRACT

A communication gateway for communicating data frames for a motor vehicle, the gateway being intended to be connected to a plurality of electronic control units in order to exchange data frames, the gateway including: as many management modules as there are electronic control units; a memory in which are stored a lookup table including an index list, with each of the indices of which is associated a memory space, a level-zero addressing table, a level-one addressing table, a level-two addressing table and an address table of levels; a space manager for managing spaces of the lookup table that is configured to determine a free index in the lookup table, and when a memory space of the lookup table is freed or is filled, to modify the byte stored in each memory region of each addressing table associated with the index.

10 Claims, 4 Drawing Sheets

(56) References Cited

U.S. PATENT DOCUMENTS

| | | | |
|---|---|---|---|
| 7,296,139 B1* | 11/2007 | Case | G06F 12/0897 |
| | | | 711/E12.043 |
| 2002/0078303 A1 | 6/2002 | Rozario et al. | |
| 2003/0115476 A1* | 6/2003 | McKee | G06F 9/52 |
| | | | 713/193 |
| 2005/0228961 A1* | 10/2005 | Reuter | G06F 3/061 |
| | | | 711/165 |
| 2007/0300037 A1* | 12/2007 | Rogers | G06F 12/0866 |
| | | | 711/E12.019 |
| 2008/0162880 A1 | 7/2008 | Sabbatini et al. | |
| 2009/0198952 A1* | 8/2009 | Khmelnitsky | G06F 12/0246 |
| | | | 711/206 |
| 2013/0219170 A1* | 8/2013 | Naitou | H04L 63/08 |
| | | | 713/153 |
| 2014/0052899 A1* | 2/2014 | Nan | G06F 12/0246 |
| | | | 711/E12.008 |
| 2016/0378396 A1* | 12/2016 | Ramanujan | G06F 12/0866 |
| | | | 711/105 |

* cited by examiner

[Fig. 1]
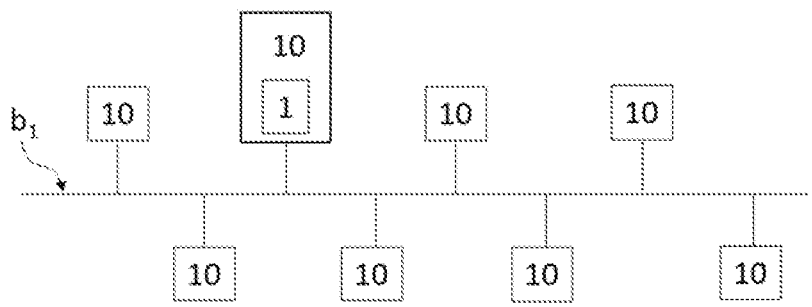
[Fig. 2]
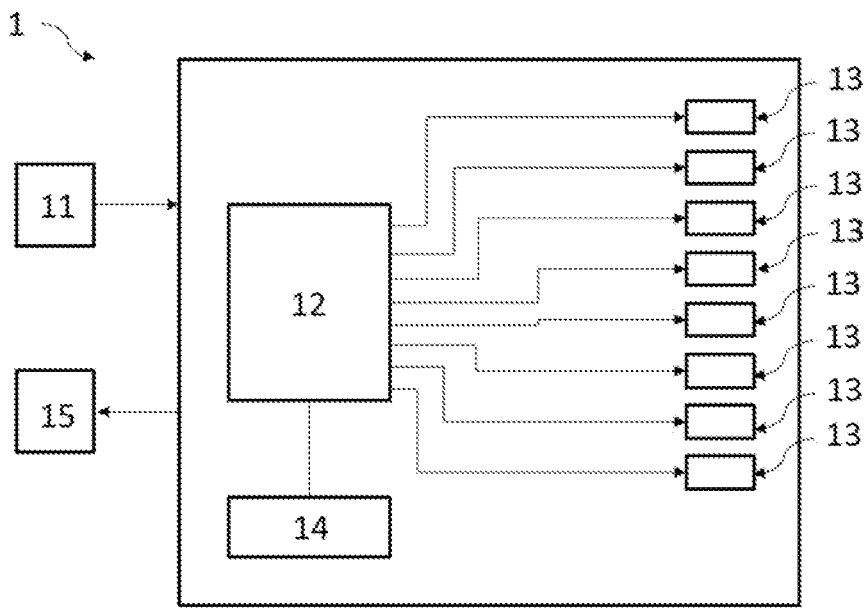
[Fig. 3]
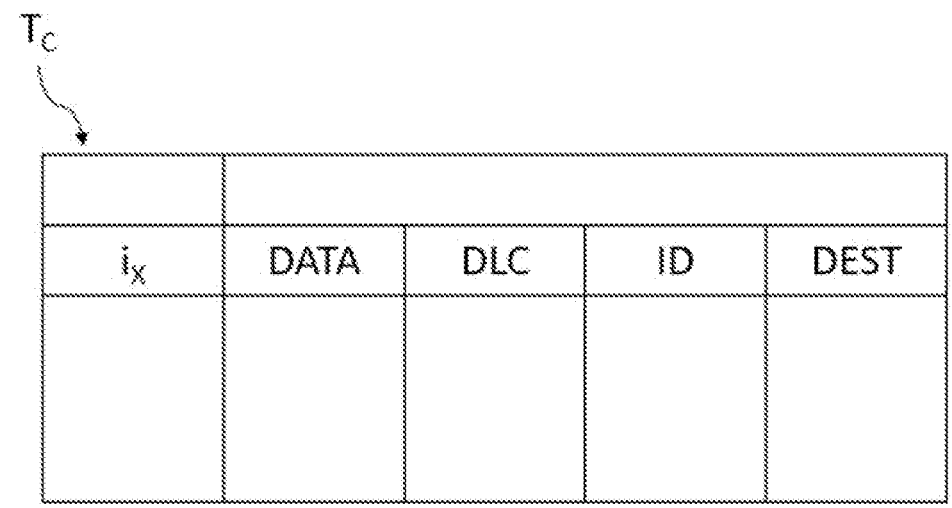

[Fig. 4]

|  | $T_1$ |
|---|---|
| 0 | 00000000 |
|  | 10000000 |
|  | 00000010 |
|  | 00000011 |
|  | 00000000 |
|  | 10000000 |
|  | 00000000 |
| 7 | 11110001 |

| $T_0$ |
|---|
| 10101110 |

|  | $T_2$ |
|---|---|
| 0 | 00000000 |
|  | 00000000 |
|  | ... |
|  | 00000000 |
|  | 00000000 |
|  | 00000001 |
|  | .... |
|  | 00010000 |
| 63 | 01000000 |

[Fig. 5]

| | T0 | T1 | T2 |
|---|---|---|---|
| $T_a$ → 00000000 | / | / | / |
| 00000001 | 0 | 0 | 0 |
| 00000010 | 64 | 8 | 1 |
| 00000011 | 0 | 0 | 0 |
| ... | ... | ... | ... |
| 10000000 | 448 | 56 | 7 |
| ... | ... | ... | ... |
| 10101110 | 64 | | |
| ... | ... | ... | ... |
| 11111101 | 0 | 0 | 0 |
| 11111110 | 64 | 8 | 1 |
| 11111111 | 0 | 0 | 0 |

[Fig. 6]
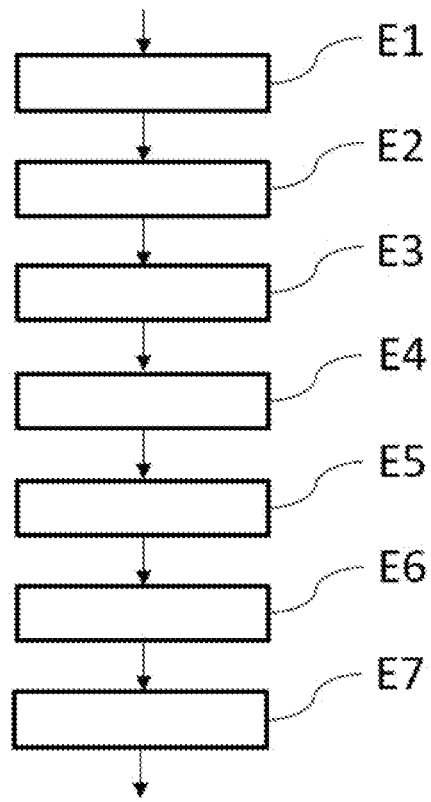
[Fig. 7]
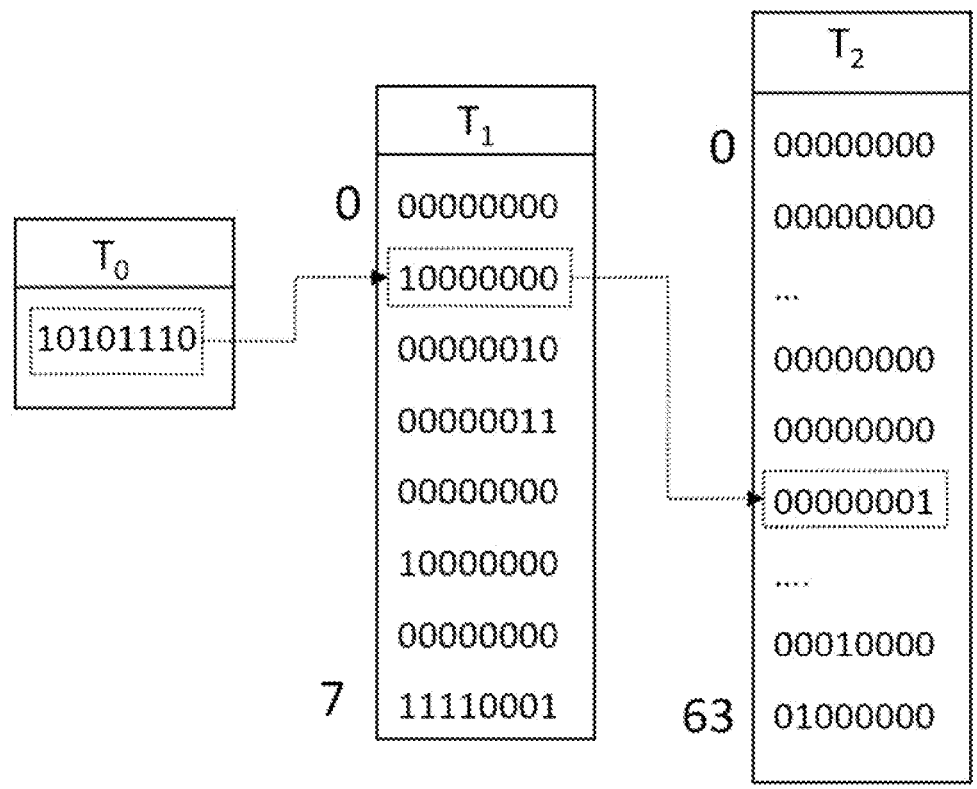

[Fig. 8]
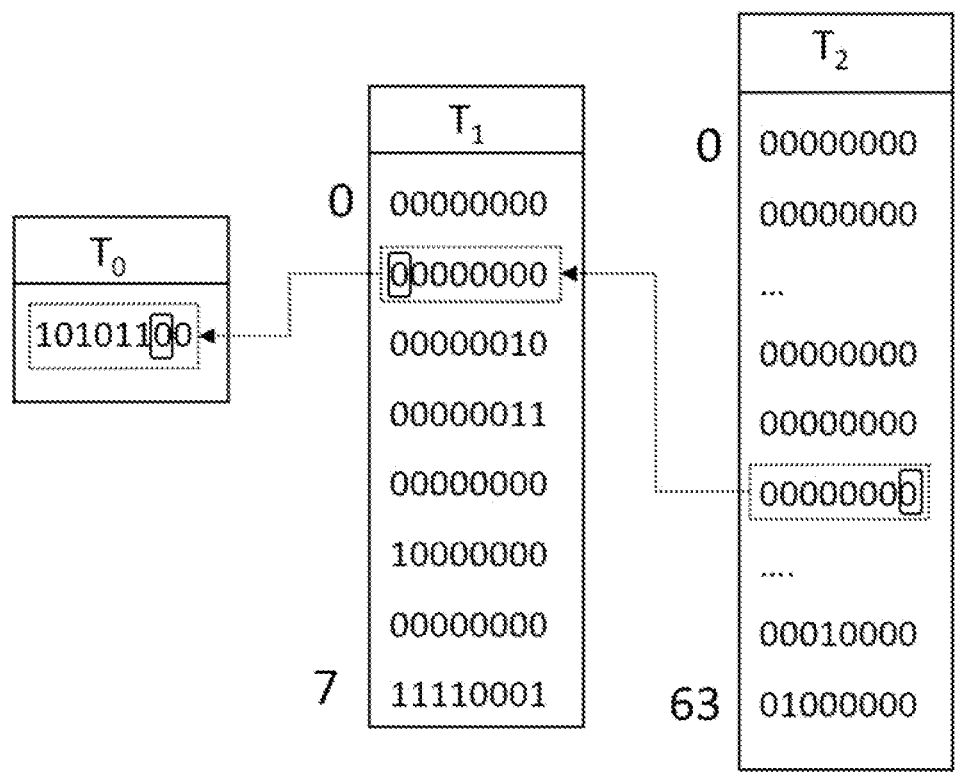

COMMUNICATION GATEWAY FOR COMMUNICATING DATA FRAMES FOR A MOTOR VEHICLE

CROSS REFERENCE TO RELATED APPLICATIONS

This application claims priority to French Patent Application No. 2000505, filed Jan. 20, 2020, the contents of such application being incorporated by reference herein.

FIELD OF THE INVENTION

The invention relates to the field of electronic control units for a motor vehicle, and more precisely to an electronic control unit intended to be connected to a communication bus of a motor vehicle. An aim of the invention is to decrease the backup time for data frames.

BACKGROUND OF THE INVENTION

In a known manner, a motor vehicle comprises a plurality of electronic control units (or ECUs), each allowing at least one item of equipment of the vehicle to be controlled.

To this end, the electronic control units are connected to one another by a communication bus, allowing them to exchange data frames. This bus may for example be of CAN ("Control Area Network") type, known per se to those skilled in the art.

To address the data frames to the recipient electronic control units, it is known practice to use a routing gateway, for example implemented by one of the electronic control units, through which all of the data frames pass.

In a known solution, the management of the data frames by the gateway is performed by using a waiting line of FIFO, for "first in first out", type. In this method, the data frames are processed in the order in which they arrive.

After receiving a data frame, and before transmitting it to the at least one electronic control unit that is the recipient of the received data frame, the gateway records, in a memory region, a plurality of items of information relating to said data frame, and in particular to the payload associated with this data frame.

For this, the gateway must first determine a free memory space in the memory region, in order to record the information relating to the received data frame there.

in order to determine a free space, it is known practice, for example, for the gateway to go through all of the memory spaces of the memory region. Over this period of determining a free space, a latency time is generated and the received data frame cannot be transmitted, which temporarily puts the exchanges of frames between the electronic control units on hold.

This latency time may be detrimental in the operation of the vehicle or when carrying out diagnostics.

Specifically, in one existing solution, it is known practice to carry out diagnostics by using what is called a UDS ("Unified Diagnostic Services") protocol between an external diagnostic tool and the gateway. In this protocol, the external tool transmits requests to one or more electronic control units which must respond to it within a given time frame. In this case, the latency times generated by the determination of a free memory space in the memory region do not allow the electronic control units to respond within the given time frame, which may slow down or skew the diagnostics.

There is therefore a need for a solution that makes it possible to overcome this drawback at least in part.

SUMMARY OF THE INVENTION

An aspect of the invention relates to a communication gateway for communicating data frames for a motor vehicle, said gateway being intended to be connected to a plurality of electronic control units in order to exchange data frames, each electronic control unit of the plurality of electronic control units being connected to said gateway via a communication bus, said gateway comprising:
   as many management modules as there are electronic control units, each management module being associated with one and only one electronic control unit;
   a memory in which the following are stored:
   a lookup table comprising an index list, with each of the indices of which is associated a memory space, in each of which may be recorded a payload of a data frame received by the gateway and at least one indicator for identifying at least one communication bus that is the recipient of said received data frame;
   an addressing table, referred to as a "level-zero" addressing table, comprising one memory region characterized by a memory address;
   an addressing table, referred to as a "level-one" addressing table, comprising eight memory regions each characterized by a memory address;
   an addressing table, referred to as a "level-two" addressing table, comprising sixty-four memory regions each characterized by a memory address,
each memory region of each addressing table comprising a byte, each bit of a byte in a memory region being defined in the following way:
   each bit of the byte of the memory region of the level-zero addressing table is associated with a memory region of the level-one addressing table;
   each bit of each byte of a memory region of the level-one addressing table is associated with a memory region of the level-two addressing table;
   each bit of each byte of a memory region of the level-two addressing table is associated with an index of the lookup table;
   an address table of levels comprising, for each possible byte value, with the exception of the zero byte, a level-zero memory address of the level-zero addressing table, a level-one memory address of the level-one addressing table and a level-two memory address of the level-two addressing table;
   a space manager for managing spaces of the lookup table, said space manager being configured to:
   determine a free index in the lookup table on the basis of the level-zero addressing table, the level-one addressing table, the level-two addressing table and the address table;
   when a memory space of the lookup table is freed or is filled, modify the byte stored in each memory region of each addressing table associated with the index of the freed or newly filled memory space, for each level zero, one and two, so as to indicate that said memory space is free or occupied, respectively.

The gateway makes it possible to rapidly record information relating to a received data frame in the lookup table, since the space manager is capable of rapidly determining a free index in the lookup table by using the level-zero addressing table, the level-one addressing table, the level-two addressing table and the address table. Thus, the gateway allows the transmission of data frames between a plurality of electronic control units to be accelerated.

In addition, the space manager is also capable of modifying each addressing table in order to signal that an index is occupied or free. Thus, the level-zero, -one and -two addressing tables are always up to date.

Preferably, in the gateway, the level-zero addressing table, the level-one addressing table and the level-two addressing table are defined in the following way:
for the level-two addressing table:
if a bit of a byte of a memory region is at 1, then the index associated with this bit is itself associated with a free memory space;
if a bit of a byte of a memory region is at 0, then the index associated with this bit is itself associated with a filled memory space;
for the level-one addressing table:
if a bit of a byte of a memory region is at 1, then the byte of the memory region of the level-two addressing table associated with this bit comprises at least one bit at one;
if a bit of a byte of a memory region is at 0, then the byte of the memory region of the level-two addressing table associated with this bit comprises no bits at one;
for the level-zero addressing table:
if a bit of the byte of the memory region is at 1, then the byte of the memory region of the level-one addressing table associated with this bit comprises at least one bit at one;
if a bit of the byte of the memory region is at 0, then the byte of the memory region of the level-one addressing table associated with this bit comprises no bits at one.

According to another embodiment, in the gateway, the level-zero addressing table, the level-one addressing table and the level-two addressing table are defined in the following way:
for the level-two addressing table:
if a bit of a byte of a memory region is at 0, then the index associated with this bit is itself associated with a free memory space;
if a bit of a byte of a memory region is at 1, then the index associated with this bit is itself associated with a filled memory space;
for the level-one addressing table:
if a bit of a byte of a memory region is at 0, then the byte of the memory region of the level-two addressing table associated with this bit comprises at least one bit at one;
if a bit of a byte of a memory region is at 1, then the byte of the memory region of the level-two addressing table associated with this bit comprises no bits at one;
for the level-zero addressing table:
if a bit of the byte of the memory region is at 0, then the byte of the memory region of the level-one addressing table associated with this bit comprises at least one bit at one;
if a bit of the byte of the memory region is at 1, then the byte of the memory region of the level-one addressing table associated with this bit comprises no bits at one.

An aspect of the invention also relates to a vehicle, in particular a motor vehicle, comprising a plurality of electronic control units, each electronic control unit of the plurality of electronic control units being connected to a communication bus, allowing data frames to be exchanged, and a gateway such as presented above.

An aspect of the invention also relates to a method for determining a free memory space in a memory, implemented by a gateway, such as presented above, said method being characterized in that it comprises:

a) a step of receiving a data frame;
b) a step of determining a free index in the lookup table on the basis of the level-zero addressing table, the level-one addressing table, the level-two addressing table and the address table;
c) a step of recording the payload of the received data frame with said determined free index.

Thus, the method makes it possible to rapidly record the information relating to a received data frame in the lookup table, since using the level-zero addressing table, the level-one addressing table, the level-two addressing table and the address table decreases the time taken to determine a free index. Thus, the method allows the transmission of data frames between a plurality of electronic control units to be accelerated.

Preferably, the method comprises, after the recording step, a step of retrieving the payload recorded in the lookup table, via said communication bus, by the at least one electronic control unit that is the recipient of the data frame associated with the payload.

Advantageously, the method comprises, after the retrieving step, a step of deleting, from the lookup table with the index associated with the transmitted payload, the payload.

Thus, each transmitted payload is deleted in order to free the memory space that formerly held the transmitted payload in order to record a new payload therein.

Preferably, the method comprises, when a memory space of the lookup table is freed or is filled, a step of modifying the byte stored in each memory region, of each level-zero, -one and -two addressing table, associated with the freed memory space so as to indicate that said memory space is free or occupied, respectively.

Preferably, the step of determining a free index comprises the substeps of:
d) determining a level-zero memory address on the basis of the address table and the level-zero addressing table;
e) determining a level-one memory address on the basis of the address table and the level-one addressing table;
f) determining a level-two memory address on the basis of the address table and the level-two addressing table;
g) determining the free index $i_x$ by summing the determined level-zero memory address, level-one memory address and level-two memory address.

Advantageously, the level-zero addressing table, the level-one addressing table and the level-two addressing table, used in the method, are defined in the following way:
for the level-two addressing table:
if a bit of a byte of a memory region is at 1, then the index associated with this bit is itself associated with a free memory space;
if a bit of a byte of a memory region is at 0, then the index associated with this bit is itself associated with a filled memory space;
for the level-one addressing table:
if a bit of a byte of a memory region is at 1, then the byte of the memory region of the level-two addressing table associated with this bit comprises at least one bit at one;
if a bit of a byte of a memory region is at 0, then the byte of the memory region of the level-two addressing table associated with this bit comprises no bits at one;
for the level-zero addressing table:
if a bit of the byte of the memory region is at 1, then the byte of the memory region of the level-one addressing table associated with this bit comprises at least one bit at one;

if a bit of the byte of the memory region is at 0, then the byte of the memory region of the level-one addressing table associated with this bit comprises no bits at one.

BRIEF DESCRIPTION OF THE DRAWINGS

Other features, details and advantages will become apparent from reading the following detailed description and from examining the appended drawings, in which:

FIG. 1 illustrates one embodiment of a gateway and of a plurality of electronic control units, connected to a communication bus according to the invention;

FIG. 2 illustrates one embodiment of a gateway according to the invention;

FIG. 3 shows one embodiment of the lookup table according to the invention;

FIG. 4 shows one embodiment of a level-zero addressing table, of a level-one addressing table and of a level-two addressing table according to the invention;

FIG. 5 shows one embodiment of an address table according to the invention;

FIG. 6 illustrates one embodiment of the method according to the invention;

FIG. 7 shows one embodiment of the step of determining a free index of the method according to the invention;

FIG. 8 shows one embodiment of the modifying step of the method according to the invention.

DETAILED DESCRIPTION OF THE PREFERRED EMBODIMENTS

One embodiment of a vehicle according to the invention will now be presented.

With reference to FIG. 1, the vehicle comprises a plurality of electronic control units 10, each allowing at least one application and/or function of the vehicle to be implemented, said electronic control units 10 being connected via a communication bus b1.

According to the example presented here, the plurality of electronic control units 10 comprises eight electronic control units 10. However, the number of electronic control units 10 may obviously be different.

A gateway 1 is used in order to ensure the transmission of data frames between a plurality of electronic control units 10, said gateway 1 being for example implemented by one of the electronic control units 10.

The electronic control unit 10 implementing the gateway 1 is configured to receive, via the communication bus b1, at least one data frame to be transmitted to at least one other electronic control unit 10.

A data frame comprises in particular an identifier of said data frame, a payload and information on the length of said payload.

The gateway 1 allows in particular a UDS, for "Unified Diagnostic Services", diagnostic communication protocol to be implemented.

With reference to FIG. 2, the gateway 1 comprises in particular a receive module 11, a memory 12, a plurality of management modules 13, a space manager 14 and a transmit module 15.

The receive module 11 is configured to receive, via the electronic control unit 10 comprising the gateway 1, the at least one data frame to be transmitted, and to transmit said data frames to the memory 12.

The memory 12 is configured to store a lookup table $T_c$, what is called a "level-zero" addressing table $T_0$, what is called a "level-one" addressing table $T_1$, what is called a "level-two" addressing table $T_2$ and an address table Ta.

With reference to FIG. 3, one embodiment of the lookup table $T_c$ is shown.

The lookup table $T_c$ comprises an index list of indices $i_x$, and each index $i_x$ has an associated memory space. In each memory space associated with an index $i_x$, there may be recorded a payload DATA of a data frame received by the gateway 1, at least one indicator making it possible to determine at least one electronic control unit that is the recipient 10 of said received data frame, a length DLC, for "data length code", and a frame identifier ID for identifying said received data frame.

An index $i_x$ is said to be "free" when the associated memory space is free; in other words, when no payload DATA, length DLC or frame identifier ID is recorded in the memory space associated with this index $i_x$.

In the case that the plurality of electronic control units 10 comprises N electronic control units 10 (N being a natural integer greater than or equal to 2), the indicators also number N.

In the example presented here, the indicators are therefore eight in number.

Preferably and in the example below, each indicator is represented by one bit. In other words, the set of indicators, denoted by "DEST", is advantageously represented by means of one byte, which by definition consists of eight bits.

Each indicator, i.e. each bit of the set of indicators DEST, is associated with an electronic control unit 10.

For a data frame whose payload DATA is recorded in the lookup table $T_c$, when the bit of an indicator is at 0, this means that the electronic control unit 10 associated with said indicator is not the recipient of said data frame. Conversely, when a bit of an indicator is at 1, this means that the electronic control unit 10 associated with said bit is the recipient of said data frame.

The length DLC of a data frame allows the number of bytes in the payload DATA to be defined.

The data frame identifier ID allows the data frame associated with said index $i_x$ to be identified.

In particular, the index list $i_x$ comprises 512 values, ranging from 0 to 511. Thus, the lookup table $T_c$ may comprise 512 sets comprising the payload DATA of a received data frame, the at least one indicator, in particular the set of indicators DEST, the length DLC and the frame identifier ID that are associated with said received data frame.

With reference to FIG. 4, what is shown is one embodiment of a level-zero addressing table $T_0$, of a level-one addressing table $T_1$ and of a level-two addressing table $T_2$.

The level-zero addressing table $T_0$ comprises one memory region.

The level-one addressing table $T_1$ comprises eight memory regions, each characterized by a memory address, numbered from 0 to 7.

The level-two addressing table $T_2$ comprises sixty-four memory regions, each characterized by a memory address, numbered from 0 to 63.

Each memory region of each addressing table comprises one byte. Each byte is read from right to left. Thus, for a given byte, the first bit is the bit on the right of the byte and the last bit is the bit on the left of the byte.

Each bit of the byte of the memory region of the level-zero addressing table $T_0$ is associated with a memory region of the level-one addressing table $T_1$.

In particular, according to the embodiment presented here, the nth (n being a natural integer between 1 and 8) bit of the memory region of the level-zero addressing table $T_0$ denotes the nth memory region of the level-one addressing table $T_1$.

Each bit of the byte of a memory region of the level-one addressing table $T_1$ is associated with a memory region of the level-two addressing table $T_2$.

More precisely, according to the embodiment presented here, the kth (k being a natural integer between 1 and 8) memory region of the level-one addressing table $T_1$ denotes a kth set of eight successive memory regions of the level-two addressing table $T_2$. In other words, the first memory region of the level-one addressing table $T_1$ is associated with the eight first memory regions of the level-two addressing table $T_2$, the second memory region of the level-one addressing table $T_1$ is associated with the eight memory regions (following the eight first memory regions) of the level-two addressing table $T_2$, . . . the eighth memory region of the level-one addressing table $T_1$ is associated with the eight last memory regions of the level-two addressing table $T_2$.

According to the embodiment presented here, for a byte in a memory region of the level-one addressing table $T_1$, the nth bit of said byte denotes the nth memory region of the eight memory regions of the level-two addressing table $T_2$ that are associated with the memory region of the level-one addressing table $T_1$ comprising said byte.

Each bit of the byte of a memory region of the level-two addressing table $T_2$ is associated with an index $i_x$ of the lookup table $T_c$.

Regarding the level-two addressing table $T_2$, if a bit of a byte of a memory region is at 1, this means that the index $i_x$ associated with this bit is free, and therefore that the memory space associated with said index $i_x$ is free. On the other hand, if said bit is at 0, this means that the associated index $i_x$ is not free, and therefore that the memory space associated with this index $i_x$ is filled.

Conversely, in another embodiment, a bit at 1 denotes an index $i_x$ that is not free and a bit at 0 denotes an index $i_x$ that is free.

Regarding the level-one addressing table $T_1$, if a bit of a byte of a memory region is at 1, this means that the byte in the memory region of the level-two addressing table $T_2$ associated with this bit comprises at least one bit at 1. In other words, this means that at least one index $i_x$ associated with said memory region of the level-two addressing table $T_2$ is free.

On the other hand, if in the level-one addressing table $T_1$ a bit of a byte is at 0, this means that the byte in the memory region of the level-two addressing table $T_2$ associated with said bit comprises no bits at 1. In other words, this means that no index $i_x$ associated with said memory region of the level-two addressing table $T_2$ is free.

Lastly, regarding the level-zero addressing table $T_0$, if a bit of the byte is at 1, this means that the byte in the memory region of the level-one addressing table $T_1$ associated with this bit comprises at least one bit at 1.

If a bit of the byte of the level-zero addressing table $T_0$ is at 0, this means that the byte in the memory region of the level-one addressing table $T_1$ associated with said bit comprises no bits at 1.

With reference to FIG. 5, the address table $T_a$ of levels comprises, for each possible byte value, with the exception of the zero byte, a level-zero memory address of the level-zero addressing table $T_0$, a level-one memory address of the level-one addressing table $T_1$ and a level-two memory address of the level-two addressing table $T_2$.

Specifically, the zero byte means that no index $i_x$ of the lookup table $T_c$ is free.

The gateway 1 comprises as many management modules 13 as there are electronic control units 10 and therefore, according to the example presented here, the gateway 1 comprises eight management modules 13. Each management module 13 is associated with one and only one electronic control unit 10 and is connected to the memory 12.

The space manager 14 is connected to the memory 12.

When a data frame is received by the receive module 11 and information recorded in the lookup table $T_c$, the space manager 14 is configured to determine the first free index $i_x$, in other words the first free memory space, in the lookup table $T_c$.

When information is recorded in a memory space of the lookup table $T_c$, the space manager 14 is configured to modify the byte stored in each memory region of each addressing table, for each level zero, one and two, that is associated with the index $i_x$ corresponding to the newly occupied memory space so as to indicate that said memory space is no longer free.

When a memory space of the lookup table $T_c$ is freed, the space manager 14 is configured to modify the byte stored in each memory region of each addressing table, for each level zero, one and two, that is associated with the index $i_x$ corresponding to the freed memory space so as to indicate that said memory space is free.

In other words, when the information, previously recorded with a given index $i_x$, is deleted, or when information is recorded with a given index $i_x$, the space manager 14 is configured to modify the byte stored in each memory region, of each level-zero, -one and -two addressing table, associated with the index $i_x$ corresponding to the newly occupied, or newly freed, memory space.

An example of modifying the content of the memory regions of each level-zero, -one and -two addressing table in the case of deleting and recording information in the lookup table $T_c$ will be presented in detail in the description of the method.

The transmit module 15 is connected to the plurality of management modules 13 and to the communication bus b1 and is configured to transmit the at least one data frame to be transmitted from the plurality of management modules 13 to the at least one recipient electronic control unit 10 via the communication bus b1.

With reference to FIG. 6, one embodiment of the method implemented by a gateway 1 such as presented above will now be presented.

In the following paragraphs, the implementation of the method for a gateway 1, for a plurality of electronic control units 10 comprising eight electronic control units 10 and for the receiving of a data frame by the gateway 1 will therefore be presented. Obviously, the number of electronic control units 10 may be other than eight, and/or the gateway 1 may receive a plurality of data frames, and reiterate the following method for each received data frame.

The method first comprises a step of receiving E1 a data frame, by the receive module 11 of the gateway 1, via the electronic control unit 10 implementing the gateway 1. The electronic control unit 10 has previously received the data frame via the communication bus b1.

The receive module 11 next transmits said received data frame to the memory 12.

The memory 12 then receives the data frame transmitted by the receive module 11.

Next, the method comprises a step of determining E2, by the space manager 14, a free index $i_x$ in the lookup table $T_c$ in order to record the payload DATA of the received data frame therein, the at least one indicator making it possible to determine at least one electronic control unit 10 that is the recipient of said received data frame, the length DLC and the frame identifier ID that are associated with said received data frame.

One exemplary implementation of the determining step E2 of the method will be described with reference to FIG. 7.

The determining step E2 first comprises a substep of determining a level-zero memory address.

For this, the space manager 14 compares the byte, recorded in the memory region of the level-zero addressing table $T_0$, with the address table $T_a$ for the level zero in order to determine the level-zero memory address.

For example, with reference to FIGS. 5 and 7, since the byte recorded in the memory region of the level-zero addressing table $T_0$ is 10101110, the space manager 14 determines that the level-zero memory address is 64.

The determining step E2 next comprises a substep of determining a level-one memory address.

For this, the space manager 14 selects the memory region, of the level-one addressing table $T_1$, that is associated with the first bit at 1 of the byte of the memory region of the level-zero addressing table $T_0$.

Next, the space manager 14 compares the byte, in the selected memory region, with the address table $T_a$ for the level one in order to determine the level-one memory address.

For example, with reference to FIGS. 5 and 7, the memory region selected by the space manager 14 corresponds to the second memory region of the level-one addressing table $T_1$. Since the byte in said second memory region is 10000000, the space manager 14 determines, by virtue of the address table $T_a$, that the level-one memory address is 56.

The determining step E2 next comprises a substep of determining a level-two memory address.

For this, the space manager 14 selects the memory region, of the level-two addressing table $T_2$, that is associated with the first bit at 1 of the byte of the selected memory region of the level-one addressing table $T_1$.

Next, the space manager 14 compares the byte, in the selected memory region of the level-zero addressing table $T_2$, with the address table $T_a$ for the level two in order to determine the level-two memory address.

For example, with reference to FIGS. 5 and 7, the memory region of the level-two addressing table $T_2$ selected by the space manager 14 corresponds to the sixteenth memory region of the level-two addressing table $T_2$. Since the byte in said sixteenth memory region is 00000001, the space manager 14 determines, by virtue of the address table $T_a$, that the level-two memory address is 0.

The determining step E2 next comprises a substep of determining the free index $i_x$, the free index $i_x$ being equal to the sum of the level-zero memory address, of the level-one memory address and of the level-two memory address.

According to the example presented here, the first free index $i_x$ is equal to 64+56+0=120.

Once the free index $i_x$ has been determined, the method comprises a step of recording E3 the payload DATA of the received data frame in the memory space associated with said determined free index $i_x$.

In the recording step E3, the at least one indicator making it possible to determine at least one electronic control unit that is the recipient of said received data frame, the length DLC and the frame identifier ID of said received data frame are also recorded with the determined free index $i_x$.

When the recording step E3 has been carried out, the method comprises a step E4 of modifying the byte stored in each memory region of each addressing table, for each level zero, one and two, that is associated with the index $i_x$ corresponding to the newly occupied memory space so as to indicate that said memory space is no longer free.

According to the example presented here, since the memory space associated with the index $i_x$ of value 120 is newly occupied, the space manager 14 therefore modifies the bit, of the memory region of the level-two addressing table $T_2$, that corresponds to said index $i_x$ by imposing the value 0 thereon.

Additionally, if all of the bits of the byte of the level-two addressing table $T_2$ in which a bit has been set to 0 are at 0, then the space manager 14 sets the bit, of the memory region of the level-one addressing table $T_1$, that corresponds to the memory region of the level-two addressing table $T_2$ in which all of the bits are now at 0, to 0.

Similarly, if all of the bits of the byte of the level-one addressing table $T_1$ in which a bit has been set to 0 are at 0, then the space manager 14 sets the bit, of the memory region of the level-zero addressing table $T_0$, that corresponds to the memory region of the level-one addressing table $T_1$ in which all of the bits are now at 0, to 0.

For example, with reference to FIG. 8, the space manager 14 sets a bit in the sixteenth memory region of the level-two addressing table $T_2$ to 0. Thus, the sixteenth memory region comprises a byte comprising only bits at 0. The space manager 14 then sets the bit, of the second memory region of the level-one addressing table $T_1$, that is associated with the modified memory region of the level-two addressing table $T_2$, to 0. Similarly, the second memory region then comprises only bits at 0. The space manager 14 then sets the bit, of the memory region of the level-zero addressing table $T_0$, that is associated with the modified memory region of the level-one table $T_1$, to 0.

If the communication bus b1 is available, then the method comprises a retrieving step E5 in which the management module 13 of each electronic control unit 10 that is the recipient of the received data frame retrieves, from the lookup table $T_c$, the payload DATA of the received data frame.

To determine the length of the payload DATA to be retrieved, the length DLC recorded in the lookup table $T_c$ is used. Specifically, the length DLC, of the payload DATA of a data frame, that is recorded in the lookup table $T_c$ allows each management module 13 of an electronic control unit 10 that is the recipient of said data frame to know the length DLC of the payload DATA to be retrieved.

Lastly, after retrieving the payload DATA, the management module 13 of each recipient electronic control unit 10 transmits said retrieved payload DATA to the associated recipient electronic control unit 10.

For this, the payload DATA is transmitted by the management module 13 of each recipient electronic control unit 10, over the communication bus b1, via the transmit module 15, in order to be transmitted to the at least one associated recipient electronic control unit 10.

When the payload DATA has been transmitted to the at least one recipient electronic control unit 10, then the method comprises a step of deleting E6, from the lookup table $T_c$ with the index $i_x$ associated with the transmitted payload DATA, the transmitted payload DATA.

In this deleting step E6, the length DLC and the frame identifier ID that are associated with said data frame that relate to the retrieved payload DATA are also deleted.

Thus, since the information mentioned above has been deleted, the index $i_x$ is free again.

Once the index $i_x$ is free again, the method comprises a second step E7 of modifying the byte stored in each memory region of each addressing table, for each level zero, one and two, that is associated with the index $i_x$ corresponding to the newly freed memory space so as to indicate that said index $i_x$ is free again.

The space manager 14 therefore modifies the bit of the level-two addressing table $T_2$ corresponding to said index $i_x$ by imposing the value 1 thereon.

If the bit, of the memory region of the level-two addressing table $T_2$, that is set to 1 is the only bit at 1 in the memory region, the space manager 14 sets the bit, of the memory region of the level-one addressing table $T_1$, that corresponds to the memory region of the level-two addressing table $T_2$ in which the bit was previously set to the value 1, to 1.

Similarly, if the bit, of the memory region of the level-one addressing table $T_1$, that is set to 1 is the only bit at 1 in the memory region, the space manager 14 sets the bit, of the level-zero addressing table $T_0$, that corresponds to the memory region of the level-one addressing table $T_1$ in which the bit was set to the value 1 by the space manager 14, to 1.

Thus, after this step, the level-zero, -one and -two addressing tables are defined like those shown with reference to FIG. 7.

Thus, advantageously, the method implemented by the gateway 1 makes it possible to rapidly determine a free space in the lookup table $T_c$ in order to record information relating to a received data frame therein. Thus, the time between the receiving of a data frame, the recording of the information relating to said received data frame, and the retrieving of these data by the at least one recipient electronic control unit is short. Thus, the transmission of data frames is accelerated.

The invention claimed is:

1. A communication gateway for communicating data frames for a motor vehicle, said gateway being intended to be connected to a plurality of electronic control units in order to exchange data frames, each electronic control unit of the plurality of electronic control units being connected to said gateway via a communication bus, said gateway comprising:
  as many management modules as there are electronic control units, each management module being associated with one and only one electronic control unit;
  a memory in which the following are stored:
    a lookup table comprising an index list, with each of the indices of which is associated a memory space, in each of which may be recorded a payload of a data frame received by the gateway and at least one indicator for identifying at least one communication bus that is the recipient of said received data frame;
    an addressing table, referred to as a "level-zero" addressing table, comprising one memory region characterized by a memory address;
    an addressing table, referred to as a "level-one" addressing table, comprising eight memory regions each characterized by a memory address;
    an addressing table, referred to as a "level-two" addressing table, comprising sixty-four memory regions each characterized by a memory address,
    each memory region of each addressing table comprising a byte, each bit of a byte in a memory region being defined in the following way:
      each bit of the byte of the memory region of the level-zero addressing table is associated with a memory region of the level-one addressing table;
      each bit of each byte of a memory region of the level-one addressing table is associated with a memory region of the level-two addressing table;
      each bit of each byte of a memory region of the level-two addressing table is associated with an index of the lookup table;
    an address table of levels comprising, for each possible byte value, with the exception of the zero byte, a level-zero memory address of the level-zero addressing table, a level-one memory address of the level-one addressing table and a level-two memory address of the level-two addressing table;
  a space manager for managing spaces of the lookup table, said space manager being configured to:
    determine a free index in the lookup table on the basis of the level-zero addressing table, the level-one addressing table, the level-two addressing table and the address table;
    when a memory space of the lookup table is freed or is filled, modify the byte stored in each memory region of each addressing table associated with the index of the freed or newly filled memory space, for each level zero, one and two, so as to indicate that said memory space is free or occupied, respectively.

2. The gateway as claimed in claim 1, wherein:
for the level-two addressing table:
  if a bit of a byte of a memory region is at 1, then the index associated with this bit is itself associated with a free memory space;
  if a bit of a byte of a memory region is at 0, then the index associated with this bit is itself associated with a filled memory space;
for the level-one addressing table:
  if a bit of a byte of a memory region is at 1, then the byte of the memory region of the level-two addressing table associated with this bit comprises at least one bit at one;
  if a bit of a byte of a memory region is at 0, then the byte of the memory region of the level-two addressing table associated with this bit comprises no bits at one;
for the level-zero addressing table:
  if a bit of the byte of the memory region is at 1, then the byte of the memory region of the level-one addressing table associated with this bit comprises at least one bit at one;
  if a bit of the byte of the memory region is at 0, then the byte of the memory region of the level-one addressing table associated with this bit comprises no bits at one.

3. The gateway as claimed in claim 1, wherein:
for the level-two addressing table:
  if a bit of a byte of a memory region is at 0, then the index associated with this bit is itself associated with a free memory space;
  if a bit of a byte of a memory region is at 1, then the index associated with this bit is itself associated with a filled memory space;
for the level-one addressing table:
  if a bit of a byte of a memory region is at 0, then the byte of the memory region of the level-two addressing table associated with this bit comprises at least one bit at one;
  if a bit of a byte of a memory region is at 1, then the byte of the memory region of the level-two addressing table associated with this bit comprises no bits at one;

for the level-zero addressing table:
    if a bit of the byte of the memory region is at 0, then the byte of the memory region of the level-one addressing table associated with this bit comprises at least one bit at one;
    if a bit of the byte of the memory region is at 1, then the byte of the memory region of the level-one addressing table associated with this bit comprises no bits at one.

4. A vehicle, in particular a motor vehicle, comprising a plurality of electronic control units, each electronic control unit of the plurality of electronic control units being connected to a communication bus, allowing data frames to be exchanged, and a gateway as claimed in claim 1.

5. A method for determining a free memory space in a memory, implemented by a gateway, as claimed in claim 1, said method comprising:
    a) receiving a data frame;
    b) determining a free index in the lookup table on the basis of the level-zero addressing table, the level-one addressing table A, the level-two addressing table and the address table; and
    c) recording the payload of the received data frame with said determined free index.

6. The method as claimed in claim 5, comprising, after the recording, retrieving the payload recorded in the lookup table, via said communication bus, by the at least one electronic control unit that is the recipient of the data frame associated with the payload.

7. The method as claimed in claim 6, comprising, after the retrieving, deleting, from the lookup table with the index associated with the transmitted payload DATA, the payload DATA.

8. The method as claimed in claim 5, comprising, when a memory space of the lookup table is freed or is filled, modifying the byte stored in each memory region, of each level-zero, -one and -two addressing table, associated with the freed memory space so as to indicate that said memory space is free or occupied, respectively.

9. The method as claimed in claim 5, wherein the determining a free index comprises:
    d) determining a level-zero memory address on the basis of the address table and the level-zero addressing table;
    e) determining a level-one memory address on the basis of the address table and the level-one addressing table;
    f) determining a level-two memory address on the basis of the address table and the level-two addressing table; and
    g) determining the free index by summing the determined level-zero memory address, level-one memory address and level-two memory address.

10. The method as claimed in claim 5, wherein the level-zero addressing table, the level-one addressing table and the level-two addressing table are defined in the following way:
    for the level-two addressing table:
        if a bit of a byte of a memory region is at 1, then the index associated with this bit is itself associated with a free memory space;
        if a bit of a byte of a memory region is at 0, then the index associated with this bit is itself associated with a filled memory space;
    for the level-one addressing table:
        if a bit of a byte of a memory region is at 1, then the byte of the memory region of the level-two addressing table associated with this bit comprises at least one bit at one;
        if a bit of a byte of a memory region is at 0, then the byte of the memory region of the level-two addressing table associated with this bit comprises no bits at one;
    for the level-zero addressing table:
        if a bit of the byte of the memory region is at 1, then the byte of the memory region of the level-one addressing table associated with this bit comprises at least one bit at one;
        if a bit of the byte of the memory region is at 0, then the byte of the memory region of the level-one addressing table associated with this bit comprises no bits at one.

* * * * *